(12) United States Patent
Kim

(10) Patent No.: US 12,044,848 B2
(45) Date of Patent: Jul. 23, 2024

(54) AUGMENTED REALITY DISPLAY HAVING IMPROVED FOV, AND WAVEGUIDE DEVICE AND DIFFRACTIVE OPTICAL STRUCTURES THEREOF

(71) Applicant: KOREA UNIVERSITY RESEARCH AND BUSINESS FOUNDATION, SEJONG CAMPUS, Sejong-si (KR)

(72) Inventor: Hwi Kim, Sejong-si (KR)

(73) Assignee: Korea University Research And Business Foundation, Sejong Campus, Sejong-Si (KR)

( * ) Notice: Subject to any disclaimer, the term of this patent is extended or adjusted under 35 U.S.C. 154(b) by 500 days.

(21) Appl. No.: 17/434,690

(22) PCT Filed: Feb. 26, 2020

(86) PCT No.: PCT/KR2020/002739
§ 371 (c)(1),
(2) Date: Oct. 12, 2021

(87) PCT Pub. No.: WO2020/175911
PCT Pub. Date: Sep. 3, 2020

(65) Prior Publication Data
US 2022/0163797 A1 May 26, 2022

(30) Foreign Application Priority Data
Feb. 28, 2019 (KR) .................. 10-2019-0023672

(51) Int. Cl.
G02B 27/01 (2006.01)
F21V 8/00 (2006.01)
G02B 5/30 (2006.01)

(52) U.S. Cl.
CPC ....... *G02B 27/0101* (2013.01); *G02B 5/3025* (2013.01); *G02B 6/0023* (2013.01); *G02B 6/005* (2013.01)

(58) Field of Classification Search
CPC .............. G02B 27/0101; G02B 5/3025; G02B 6/0023; G02B 6/005
(Continued)

(56) References Cited

U.S. PATENT DOCUMENTS 6,812,973 B2  11/2004  Alakontiola
7,233,563 B2   6/2007  Ueki
(Continued)

FOREIGN PATENT DOCUMENTS

JP          4425059       3/2010
KR   10-2008-0108924    12/2008
(Continued)

OTHER PUBLICATIONS

International Search Report in International Application No. PCT/KR2020/002739, mailed May 29, 2020 (4 pages).

*Primary Examiner* — William Choi
(74) *Attorney, Agent, or Firm* — NIXON PEABODY LLP

(57) ABSTRACT

Various embodiments may provide an augmented reality display having an improved FOV, and a waveguide device and diffractive optical structures thereof. The augmented reality display may comprise: a light source configured to generate light related to an image; and the waveguide device for outputting at least a part of the light. The waveguide device may comprise: a waveguide for guiding light therein; and the diffractive optical structures arranged on a first surface and a second surface of the waveguide. The diffractive optical structures may comprise: a first polarization structure arranged on the first surface of the waveguide to transmit, to the outside of the waveguide, first polarized light (Continued)

selected from external light and reflect, to the inside of the waveguide, second polarized light selected from light guided inside the waveguide device; and a second polarization structure arranged on the second surface of the waveguide to output at least a part of the second polarized light to the outside of the waveguide.

20 Claims, 16 Drawing Sheets

(58) Field of Classification Search
USPC .......................................... 359/630; 345/7–9
See application file for complete search history.

(56) References Cited

U.S. PATENT DOCUMENTS

| 7,618,178 | B2 | 11/2009 | Mi | |
|---|---|---|---|---|
| 10,114,220 | B2 | 10/2018 | Grey | |
| 2005/0202694 | A1* | 9/2005 | Yumoto | H05K 1/147 |
| | | | | 439/67 |

FOREIGN PATENT DOCUMENTS

| KR | 10-2017-0039655 | 4/2017 |
|---|---|---|
| KR | 10-1799936 | 11/2017 |

* cited by examiner

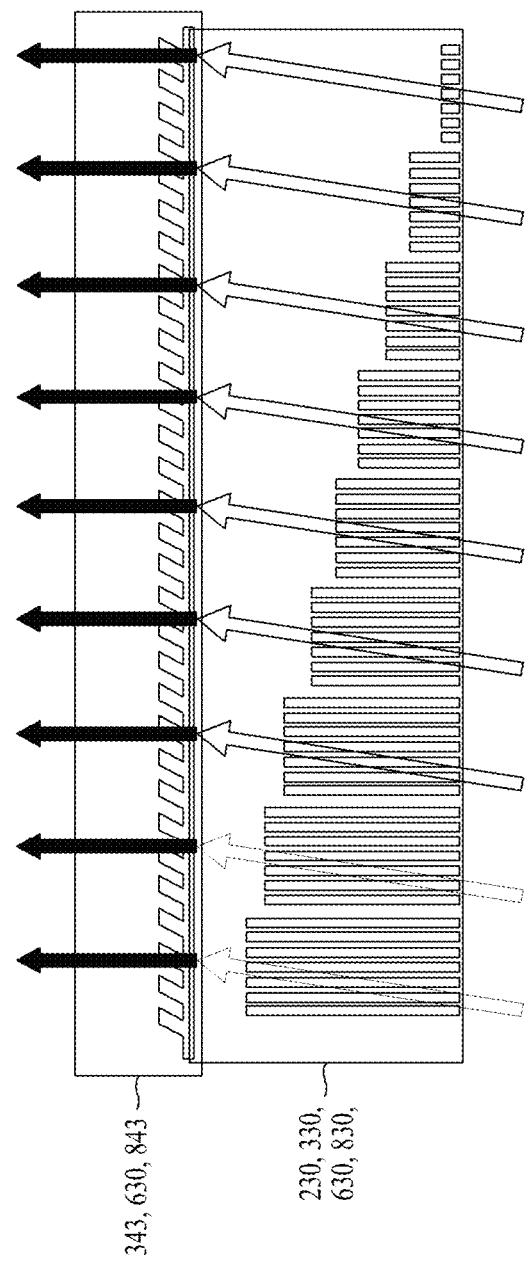

(a)

(b)

(a)

(b)

AUGMENTED REALITY DISPLAY HAVING IMPROVED FOV, AND WAVEGUIDE DEVICE AND DIFFRACTIVE OPTICAL STRUCTURES THEREOF

REFERENCES TO RELATED APPLICATIONS

This application is a U.S. national stage of PCT/KR2020/002739 filed on Feb. 26, 2020, which claims the benefits of Korean patent application No. 10-2019-0023672, filed on Feb. 28, 2019, the contents of which are all incorporated herein by reference in their entireties.

TECHNICAL FIELD

Various embodiments relate to an augmented reality display having an improved field of view (FOV) and a waveguide device and a diffractive optical structure thereof.

BACKGROUND ART

In general, an augmented reality display overlaps a virtual image on the real world seen by a user's eye. The augmented reality display makes ambiguous the distinction of a user between the real world and the virtual image. For example, the augmented reality display may be implemented as a head mounted display (HMD) which may be worn by a user. Such an augmented reality display may include a waveguide and a plurality of diffraction gratings. The diffraction gratings may be mounted on the waveguide and diffract received light. Accordingly, when the diffraction gratings output at least some of the received light, a user can monitor an image related to the received light.

DISCLOSURE

Technical Problem

However, such an augmented reality display has a problem in that a field of view (FOV) is limited within a given level. The reason for this is that the FOV of the augmented reality display is determined by a total reflection angle of light within a waveguide, but the light is lost because at least some thereof is transmitted when an incident angle of the light is smaller than a critical angle. Accordingly, there is a need for a scheme capable of improving the FOV of an augmented reality display.

Technical Solution

A diffractive optical structure of an augmented reality display according to various embodiments may include a first polarization structure disposed on a first face of a waveguide, transmitting, to the outside of the waveguide, a first polarized light of light guided within the waveguide, and reflecting a second polarized light of the light to the inside of the waveguide, and a second polarization structure disposed on a second face of the waveguide and outputting at least some of the second polarized light to the outside of the waveguide.

A waveguide device of an augmented reality display according to various embodiments may include a waveguide guiding light therein, a first polarization structure disposed on a first face of the waveguide, transmitting a first polarized light of the light to the outside of the waveguide, and reflecting a second polarized light of the light to the inside of the waveguide, and a second polarization structure disposed on a second face of the waveguide and outputting at least some of the second polarized light to the outside of the waveguide.

An augmented reality display according to various embodiments includes a light source configured to generate light related to an image, and a waveguide device outputting at least some of the light. The waveguide device may include a waveguide guiding the light therein, a first polarization structure disposed on a first face of the waveguide, transmitting a first polarized light of the light to the outside of the waveguide, and reflecting a second polarized light of the light to the inside of the waveguide, and a second polarization structure disposed on a second face of the waveguide and outputting at least some of the second polarized light to the outside of the waveguide.

Advantageous Effects

According to various embodiments, a field of view (FOV) of the augmented reality display can be improved because the first polarization structure and the second polarization structure totally reflects light guided in the waveguide. That is, a loss attributable to the transmission of light guided in the waveguide can be blocked because the first polarization structure and the second polarization structure mirror-reflects (total reflection) light having a specific polarized light (second polarized light) and guided in the waveguide. Accordingly, the FOV of the augmented reality display can be improved regardless of an incident angle of light inputted to the waveguide.

In contrast, a user can simultaneously monitor an augmented reality image having an expanded FOV and an external image because a first polarized light component of a seethrough external image having a given polarization state passes through the first polarization structure and the second polarization structure without distortion.

DESCRIPTION OF DRAWINGS

FIGS. 10A and 10B are diagrams illustrating modified examples of a second polarizer in a waveguide device according to various embodiments.

MODE FOR INVENTION

Figure 1:
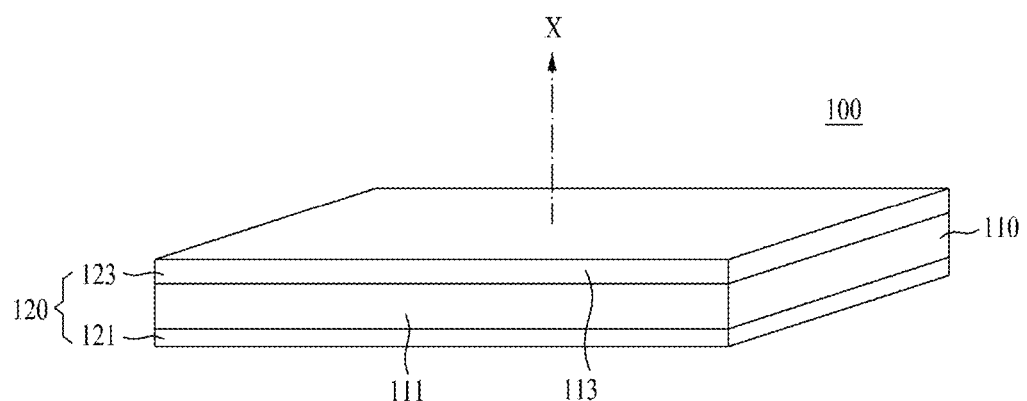
FIG. 1 is a diagram illustrating a waveguide device according to various embodiments.

Hereinafter, various embodiments of this document are described with reference to the accompanying drawings.

Various embodiments of this document and the terms used in the embodiments are not intended to limit the technology described in this document to a specific embodiment, but should be construed as including various changes, equivalents and/or alternatives of a corresponding embodiment. Regarding the description of the drawings, similar reference numerals may be used in similar elements. An expression of the singular number may include an expression of the plural number unless clearly defined otherwise in the context. In this document, an expression, such as "A or B", "at least one of A and/or B", "A, B or C" or "at least one of A, B and/or C", may include all of possible combinations of listed items together. Expressions, such as "a first," "a second," "the first" or "the second", may modify corresponding elements regardless of its sequence or importance, and are used to only distinguish one element from the other element and do not limit corresponding elements. When it is described that one (e.g., a first) element is "(functionally or communicatively) connected to" or "coupled with" the other (e.g., a second) element, one element may be directly connected to the other element or may be connected to the other element through another element (e.g., a third element).

An augmented reality (AR) display according to various embodiments may include a light source S and a waveguide device. The light source may generate light related to an image. The waveguide device may output at least some of the light generated by the light source. In this case, the waveguide device may output at least some of the light in a predetermined area. Accordingly, a user of the AR display can monitor an image through the predetermined area.

Figure 2:
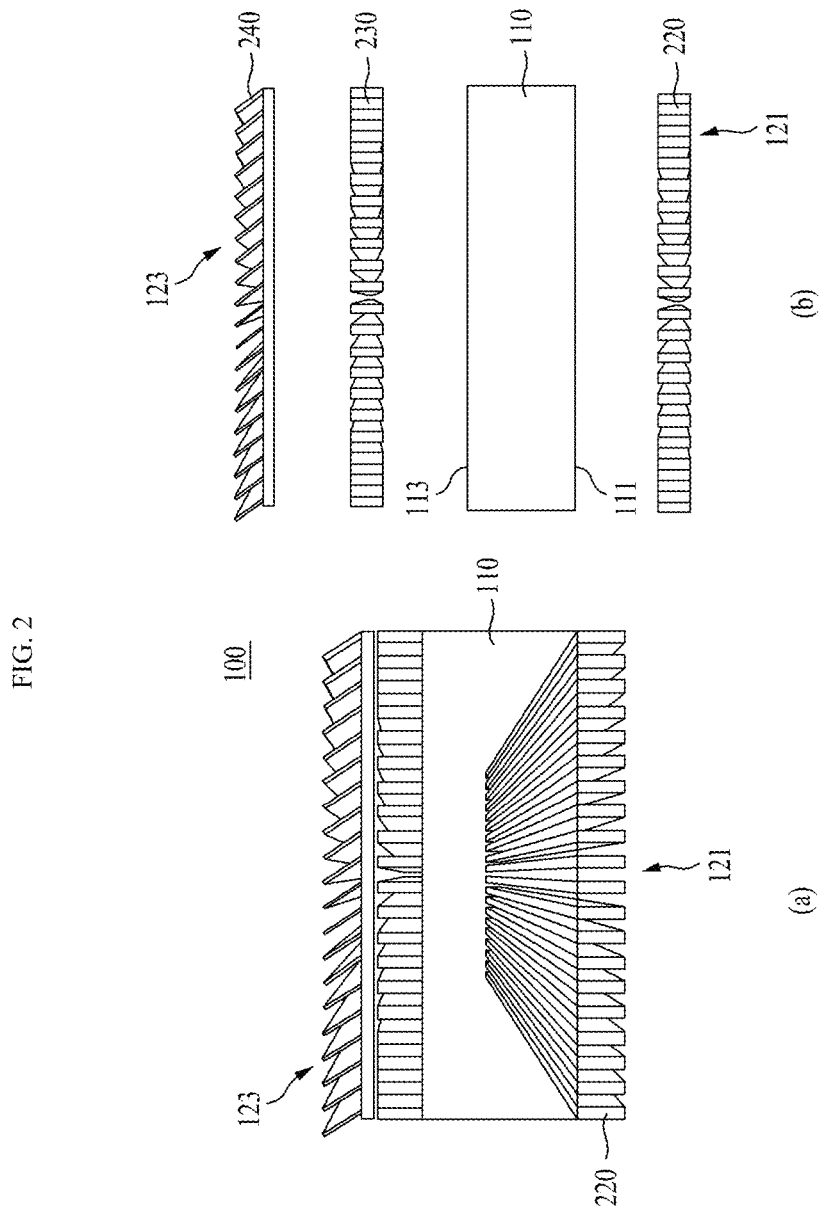
FIG. 2 is a diagram illustrating the waveguide device according to an embodiment.

FIG. 1 is a diagram illustrating a waveguide device 100 according to various embodiments. FIG. 2 is a diagram illustrating the waveguide device 100 according to an embodiment.

Referring to FIG. 1, the waveguide device 100 according to various embodiments may include a waveguide 110 and a diffractive optical structure 120.

The waveguide 110 may guide light within the waveguide 110. The waveguide 110 may guide light generated by a light source (not illustrated). The waveguide 110 may include a first face 111 and a second face 113. Furthermore, the first face 111 and the second face 113 may be isolated from each other by a thickness T of the waveguide 110. In this case, an axis X extending in a direction perpendicular to the first face 111 and the second face 113 may be defined.

The diffractive optical structure 120 may output at least some of light from the waveguide 110. In this case, the diffractive optical structure 120 may be disposed in the first face 111 and second face 113 of the waveguide 110, and may totally reflect light to the inside of the waveguide 110. Furthermore, the diffractive optical structure 120 may output light to the outside of the waveguide 110 in accordance with a predetermined area of the waveguide 110. The diffractive optical structure 120 may include a first polarization structure 121 and a second polarization structure 123. The first polarization structure 121 may be disposed on the first face 111 of the waveguide 110. The second polarization structure 123 may be disposed on the second face 113 of the waveguide 110. The first polarization structure 121 and the second polarization structure 123 may be disposed on opposite sides thereof with the waveguide 110 interposed therebetween in the axis X. According to an embodiment, the diffractive optical structure 120 may include the first polarization structure 121 and the second polarization structure 123, as illustrated in FIG. 2.

The first polarization structure 121 may include a first polarizer 220. The first polarizer 220 may be disposed on the first face 111 of the waveguide 110. The first polarizer 220 may transmit a first polarized light and reflect a second polarized light. For example, the first polarizer 220 may include a wire grid polarizer (WGP).

The second polarization structure 123 may include a second polarizer 230 and at least one diffraction grating 240. The second polarizer 230 may be disposed on the second face 113 of the waveguide 110. The second polarizer 230 may reflect the second polarized light and transmit at least some of the second polarized light. For example, the second polarizer 230 may include a WGP. The diffraction grating 240 may be stacked on at least some of the second polarizer 230. The diffraction grating 225 may overlap at least some of the second polarizer 230 in the axis X. For example, the diffraction grating 240 may include a chevron grating. In this case, the chevron grating has an intensity adjustment characteristic of light. Meanwhile, the chevron grating has a wavelength-selective characteristic that responds to a specific wavelength area 0∥, but may be designed to be stacked in a plurality of layers in order to overcome the wavelength-selective characteristic. The diffraction grating 240 may include at least one of an input grating or an output grating. The input grating may input, to the waveguide 110, light generated by the light source. The output grating may output at least some of the second polarized light transmitted through the second polarizer 230.

Figure 3:
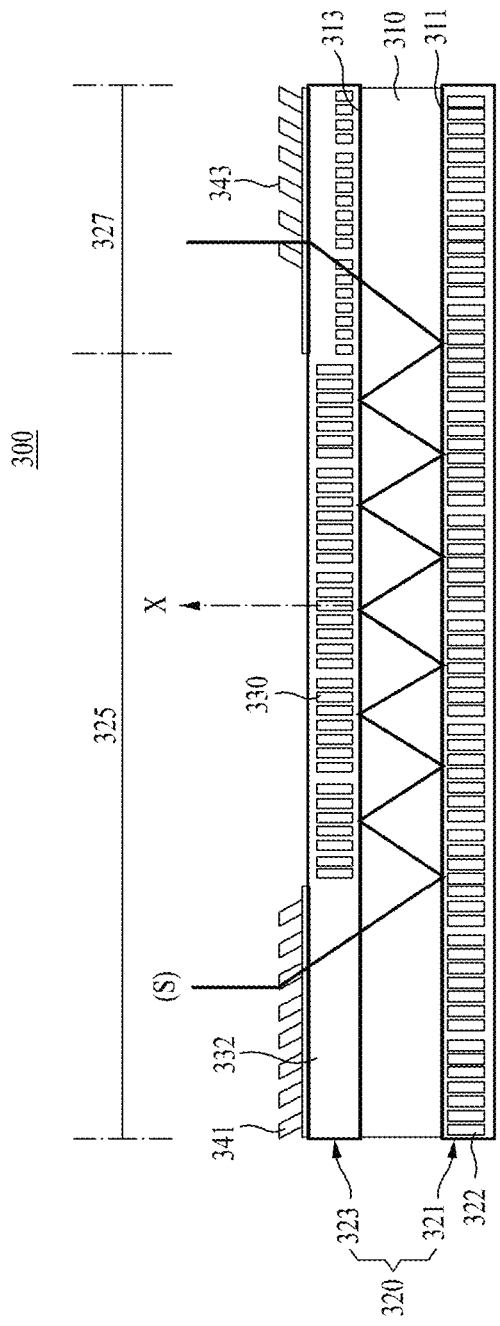
FIG. 3 is a diagram illustrating a waveguide device according to a first embodiment.
Figure 4:
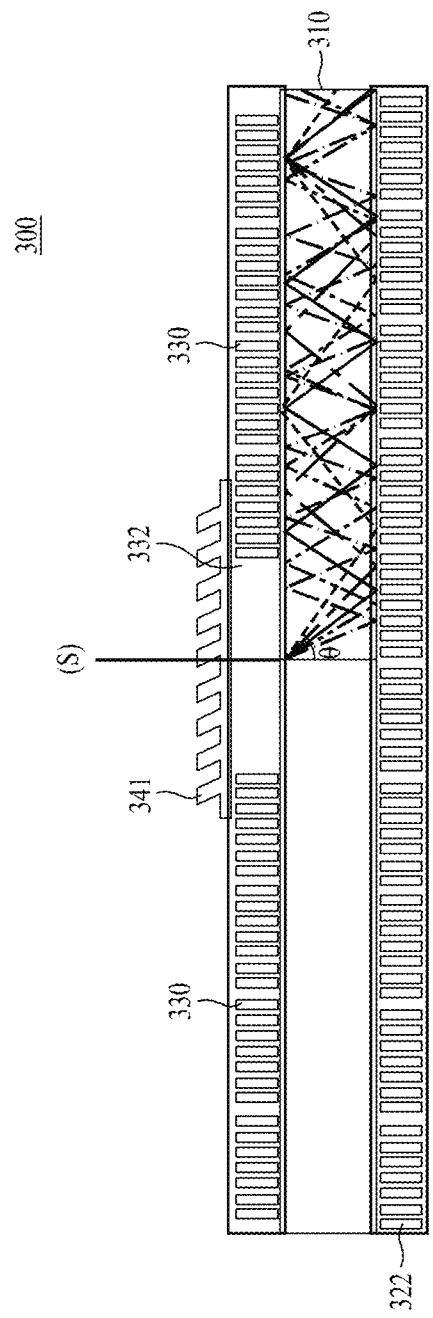
FIGS. 4 and 5 are diagrams for describing characteristics of the waveguide device according to the first embodiment.
Figure 5:
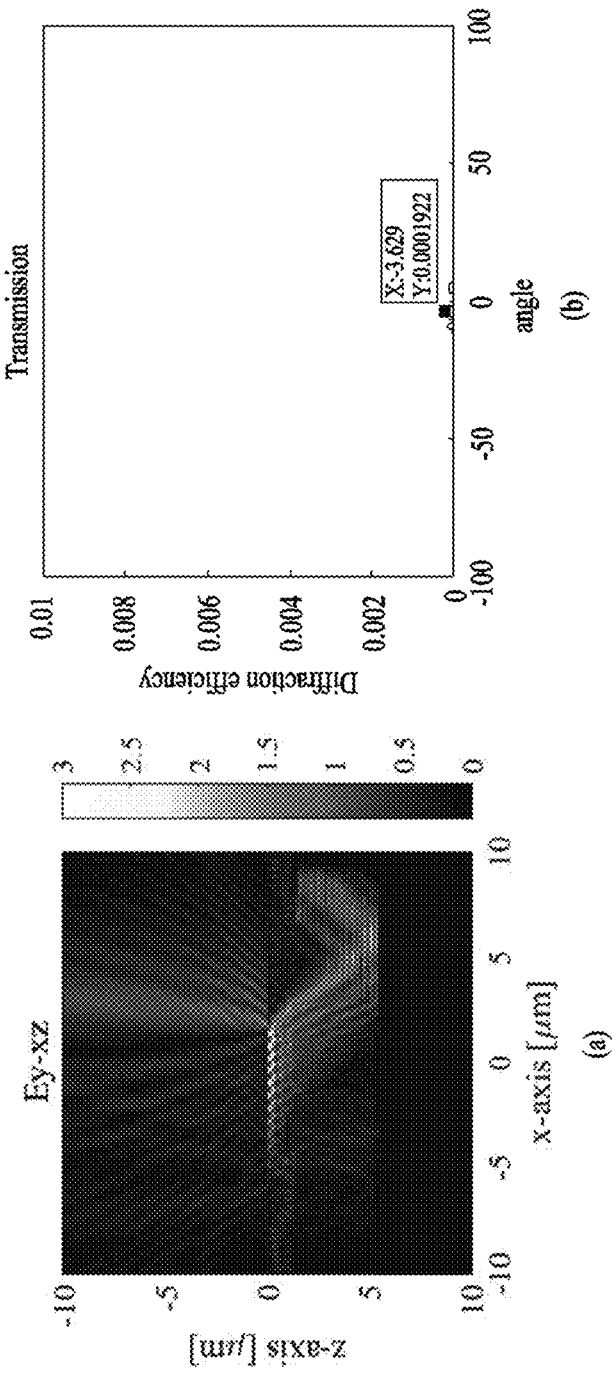

FIG. 3 is a diagram illustrating a waveguide device 300 (e.g., the waveguide device 100 in FIGS. 1 and 2) according to a first embodiment. FIGS. 4 and 5 are diagrams for describing characteristics of the waveguide device according to the first embodiment.

Referring to FIG. 3, the waveguide device 300 according to the first embodiment may include a waveguide 310 (e.g., the waveguide 110 in FIGS. 1 and 2) and a diffractive optical structure 320 (e.g., the diffractive optical structure 120 in FIGS. 1 and 2).

The waveguide 310 may guide light within the waveguide 310. The waveguide 310 may guide light generated by a light source S. The waveguide 310 may include a first face 311 (e.g., the first face 111 in FIGS. 1 and 2) and a second face 313 (e.g., the second face 113 in FIGS. 1 and 2). Furthermore, the first face 311 and the second face 313 may be isolated from each other by a thickness T of the waveguide 310. In this case, an axis X extending in a direction perpendicular to the first face 311 and the second face 313 may be defined.

The diffractive optical structure 320 may output at least some of light guided in the waveguide 310. In this case, the diffractive optical structure 320 may be disposed on the first face 311 and second face 313 of the waveguide 310, and may totally reflect light to the inside of the waveguide 310. Furthermore, the diffractive optical structure 320 may output light to the outside of the waveguide 310 in accordance with a predetermined area of the waveguide 310. The diffractive optical structure 320 may include a first polarization structure 321 (e.g., the first polarization structure 121 in FIGS. 1 and 2) and a second polarization structure 323 (e.g., the second polarization structure 123 in FIGS. 1 and 2). The first polarization structure 321 and the second polarization structure 323 may be disposed on opposite sides thereof with the waveguide 310 interposed therebetween in the axis X.

The first polarization structure 321 may include a first polarizer 322 (e.g., the first polarizer 220 in FIG. 2). The first polarizer 322 may be disposed on the first face 311 of the waveguide 310. For example, the first polarizer 322 may include a WGP. The first polarizer 322 may transmit, to the outside, a first polarized light of light incident from the outside of the waveguide 310 through the waveguide 310. Furthermore, the first polarizer 322 may reflect, to the inside of the waveguide 310, a second polarized light of the light guided within the waveguide 310.

The second polarization structure 323 may be divided into a first area 325 and a second area 327. The first area 325 and the second area 327 may be disposed on a plane parallel to the second face 313 in the axis X. The second polarization structure 323 may include a second polarizer 330 (e.g., the second polarizer 230 in FIG. 2), an input grating 341 (e.g., the diffraction grating 240 in FIG. 2) and an output grating 343 (e.g., the diffraction grating 240 in FIG. 2).

The second polarizer 330 may be disposed on the second face 313 of the waveguide 310. The second polarizer 330 may be disposed over the first area 325 and the second area 327. The second polarizer 330 may reflect, to the inside of the waveguide 310, the second polarized light of the light guided within the waveguide 310.

In this case, the second polarizer 330 may transmit, to the outside, the first polarized light of the light incident from the outside of the waveguide 310 through the waveguide 310.

Furthermore, the second polarizer 330 may transmit, to the outside of the waveguide 310, at least some of the second polarized light of the light guided within the waveguide 310. For example, the second polarizer 330 may include a WGP. That is, the second polarizer 330 may reflect the second polarized light to the inside of the waveguide 310 in the first area 325, and may transmit at least some of the second polarized light in the second area 327. To this end, the second polarizer 330 may be formed in a first thickness in accordance with the first area 325, and may be formed in a second thickness in accordance with the second area 327. The second thickness may be smaller than the first thickness. In this case, the second polarizer 330 may include at least one opening 332. A part of the waveguide 310 may be exposed through the opening 332.

The input grating 341 may be disposed in the first area 325. In this case, the input grating 341 may be disposed in accordance with the opening 332 of the second polarizer 330. For example, the input grating 341 may be inserted into the opening 332. For another example, the input grating 341 may be disposed to overlap the opening 332 in the axis X. The input grating 341 may input light to the inside of the waveguide 310. To this end, the input grating 341 may diffract light received from the light source S. At this time, the input grating 341 may diffract the light received from the light source S in opposite to the opening 332 of the second polarizer 330.

The output grating 343 may be disposed in the second area 327. The output grating 343 may be disposed to overlap the second polarizer 330 in the second area 327 in the axis X. In this case, the output grating 343 may be stacked on the second polarizer 330 in the second area 327. The output grating 343 may output, to the outside of the waveguide 310, at least some of the second polarized light of the light guided within the waveguide 310. To this end, the output grating 343 may diffract at least some of the second polarized light transmitted through the second polarizer 330 in the second area 327. At this time, the output grating 343 may output at least some of the second polarized light in a direction parallel to the direction of light inputted from the light source S to the input grating 341.

According to the first embodiment, the input grating 341 may input, to the waveguide 310, light received from the light source S. The input grating 341 may input the light, received from the light source S, to the waveguide 310 through the opening 332 of the second polarizer 330. Accordingly, the waveguide 310 may guide the light received through the input grating 341 within the waveguide 310. The first polarizer 322 and the second polarizer 330 may reflect the light guided within the waveguide 310, as illustrated in FIG. 4. In this case, the first polarizer 322 and the second polarizer 330 may reflect the second polarized light.

According to the results of measurement of an intensity distribution of light in the waveguide device 310, as illustrated in (a) of FIG. 5, the first polarizer 322 and the second polarizer 330 may totally reflect light guided within the waveguide 310. In this case, the first polarizer 322 and the second polarizer 330 may totally reflect the second polarized light. For example, at a location where a value of an x axis is 0 and a value of a z axis is 0, the input grating 341 may input, to the waveguide 310, light received from the light source S in a direction parallel to the axis X. Furthermore, in an area corresponding to a value of a z axis having 1 um to 5 um, the first polarizer 322 and the second polarizer 330 may totally reflect light guided within the waveguide 310. At this time, the light guided within the waveguide 310 may not be transmitted to the outside of the waveguide 310. For example, as illustrated in (b) of FIG. 5, the amount of light transmitted to the outside of the waveguide 310 may be insignificant, that is, approximately 0.02%. In this case, in (b) of FIG. 5, the x axis may indicate the direction of light, and a y axis may indicate transmissivity.

Figure 6:
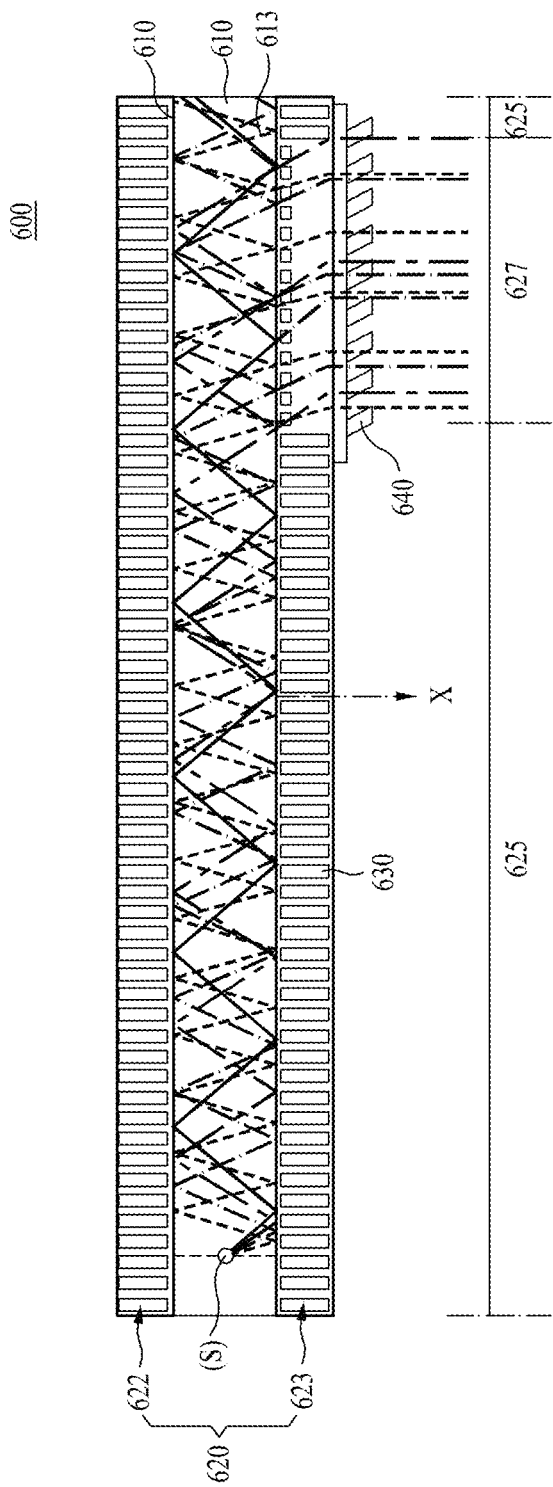
FIG. 6 is a diagram illustrating a waveguide device according to a second embodiment.
Figure 7:
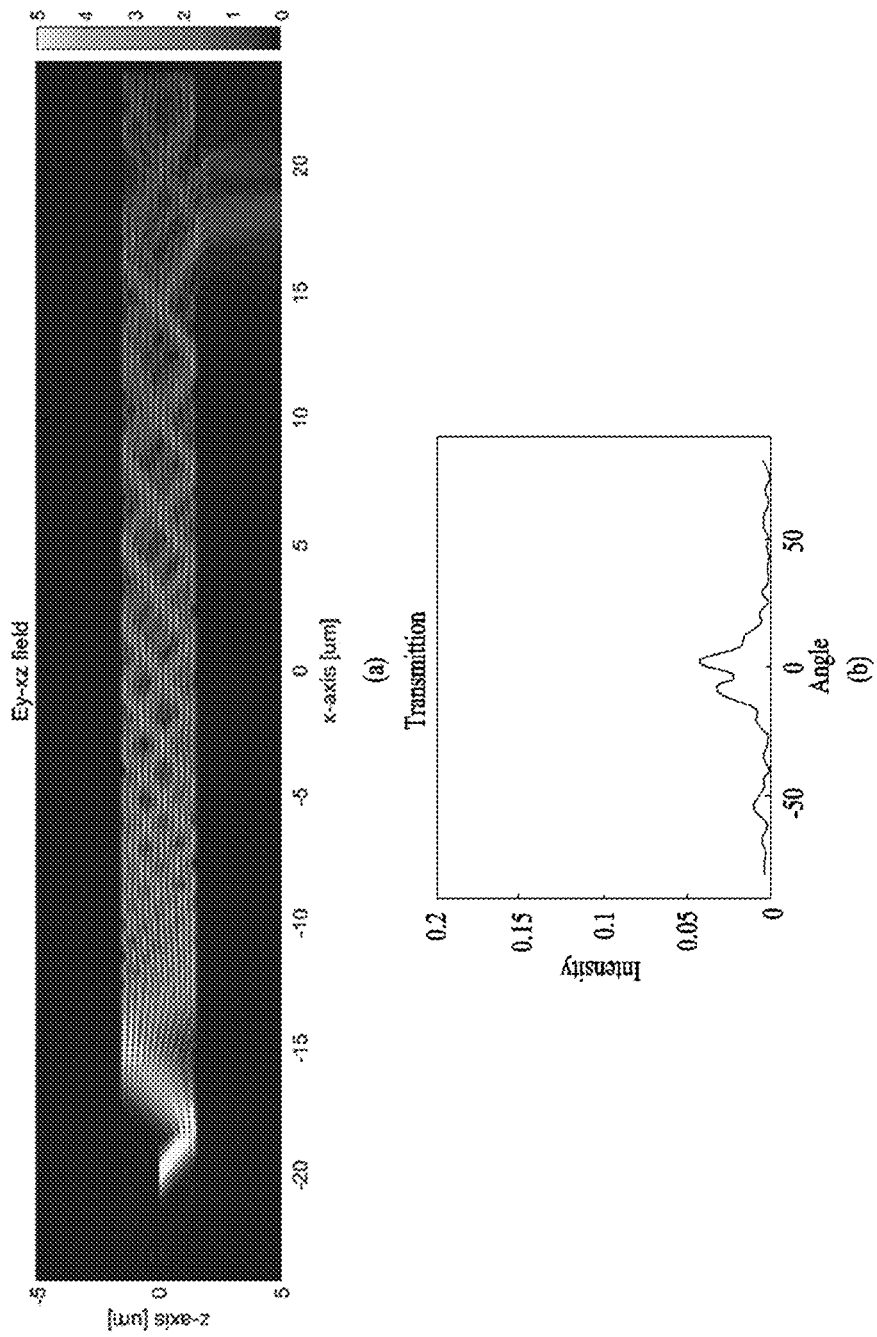
FIG. 7 is a diagram for describing characteristics of the waveguide device according to the second embodiment.

FIG. 6 is a diagram illustrating a waveguide device 600 (e.g., the waveguide device 100 in FIGS. 1 and 2) according to a second embodiment. FIG. 7 is a diagram for describing characteristics of the waveguide device 600 according to the second embodiment.

Referring to FIG. 6, the waveguide device 600 according to the second embodiment may include a waveguide 610 (e.g., the waveguide 110 in FIGS. 1 and 2) and a diffractive optical structure 620 (e.g., the diffractive optical structure 120 in FIGS. 1 and 2).

The waveguide 610 may guide light within the waveguide 610. The waveguide 610 may guide light generated by a light source S. In this case, the light source S may be disposed within the waveguide 610. The waveguide 610 may include a first face 611 (e.g., the first face 111 in FIGS. 1 and 2) and a second face 613 (e.g., the second face 113 in FIGS. 1 and 2). Furthermore, the first face 611 and the second face 613 may be isolated from each other by a thickness T of the waveguide 610. In this case, an axis X extending in a direction perpendicular to the first face 611 and the second face 613 may be defined.

The diffractive optical structure 620 may output at least some of light from the waveguide 610. In this case, the diffractive optical structure 620 may be disposed on the first face 611 and second face 613 of the waveguide 610, and may totally reflect light to the inside of the waveguide 610. Furthermore, the diffractive optical structure 620 may output light to the outside of the waveguide 610 in accordance with a predetermined area of the waveguide 610. The diffractive optical structure 620 may include a first polarization structure 621 (e.g., the first polarization structure 121 in FIGS. 1 and 2) and a second polarization structure 623 (e.g., the second polarization structure 123 in FIGS. 1 and 2). The first polarization structure 621 and the second polarization structure 623 may be disposed on opposite sides thereof with the waveguide 610 interposed therebetween in the axis X.

The first polarization structure 621 may include a first polarizer 622 (e.g., the first polarizer 220 in FIG. 2). The first polarizer 622 may be disposed on the first face 611 of the waveguide 610. For example, the first polarizer 622 may include a WGP. The first polarizer 622 may transmit, to the outside of the waveguide 610, a first polarized light of a seethrough light incident from the outside of the waveguide 310. Furthermore, the first polarizer 622 may reflect, to the inside of the waveguide 610, a second polarized light of the light guided within the waveguide 610.

The second polarization structure 623 may be divided into a first area 625 and a second area 627. The first area 625 and the second area 627 may be disposed on a plane parallel to the second face 613 in the axis X. The second polarization structure 623 may include a second polarizer 630 (e.g., the second polarizer 230 in FIG. 2) and an output grating 640 (e.g., the diffraction grating 240 in FIG. 2).

The second polarizer 630 may be disposed on the second face 613 of the waveguide 610. The second polarizer 630 may be disposed over the first area 625 and the second area 627. The second polarizer 630 may reflect, to the inside of the waveguide 610, the second polarized light of the light guided within the waveguide 610. At this time, the second polarizer 630 may transmit, to the outside of the waveguide 610, the first polarized light of the seethrough light included from the outside of the waveguide 610. Furthermore, the second polarizer 630 may transmit, to the outside of the waveguide 610, at least some of the second polarized light of the light guided within the waveguide 610. For example, the second polarizer 630 may include a WGP. That is, the second polarizer 630 may reflect the second polarized light to the inside of the waveguide 610 in the first area 625, and may transmit at least some of the second polarized light in the second area 627. To this end, the second polarizer 630 may be formed in a first thickness in accordance with the first area 625, and may be formed in a second thickness in accordance with the second area 627. The second thickness may be smaller than the first thickness.

The output grating 640 may be disposed in the second area 627. The output grating 640 may be disposed to overlap the second polarizer 630 in the second area 627 in the axis X. In this case, the output grating 640 may be stacked on the second polarizer 630 in the second area 627. The output grating 640 may output, to the outside of the waveguide 610, at least some of the second polarized light of the light guided within the waveguide 610. To this end, the output grating 640 may diffract at least some of the second polarized light transmitted through the second polarizer 630 in the second area 627.

According to the second embodiment, the light source S may generate light within the waveguide 610. Accordingly, the light source S may input the light to the inside of the waveguide 610. The waveguide 610 may guide the light received from the light source S within the waveguide 610. The first polarizer 622 and the second polarizer 630 may reflect the light guided within the waveguide 310, as illustrated in FIG. 6. In this case, the first polarizer 622 and the second polarizer 630 may reflect the second polarized light. Accordingly, the light generated by the light source S may fully reach the output grating 640.

According to the results of measurement of an intensity distribution of light in the waveguide device 610, as illustrated in (a) of FIG. 7, the first polarizer 622 and the second polarizer 630 may totally reflect light guided within the waveguide 610. In this case, the first polarizer 622 and the second polarizer 630 may totally reflect the second polarized light. For example, at a location where a value of an x axis is –20 um and a value of a z axis is 0, light generated by the light source S may be inputted to the waveguide 310. Furthermore, in an area corresponding to a value of a z axis having –0.15 um to 0.15 um, the first polarizer 622 and the second polarizer 630 may totally reflect light guided within the waveguide 610. Furthermore, the output grating 640 may output at least some of the light guided within the waveguide 610 in a direction parallel to the axis X in the second area 627. At this time, the light guided within the waveguide 610 may not be transmitted to the outside of the waveguide 610 in the first area 625. For example, as illustrated in (b) of FIG. 7, the amount of light transmitted to the outside of the waveguide 610 in the first area 625 may be insignificant. In this case, in (b) of FIG. 7, the x axis may indicate the direction of light, and the y axis may indicate transmissivity.

Figure 8:
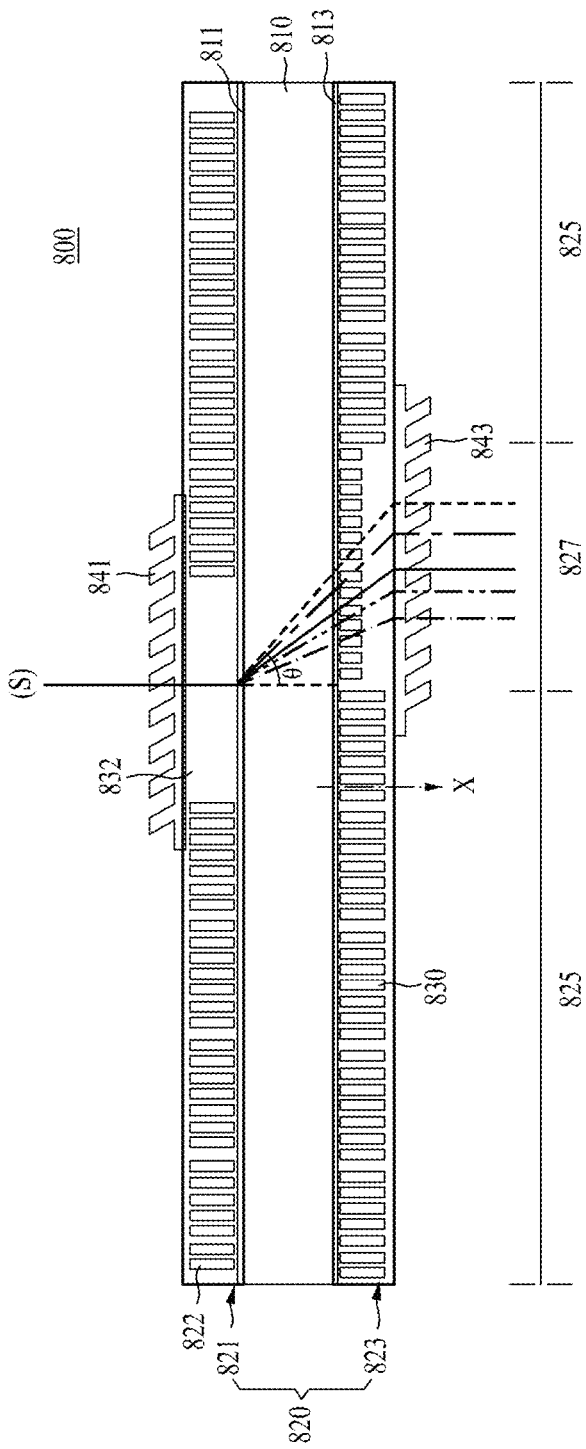
FIG. 8 is a diagram illustrating a waveguide device according to a third embodiment.
Figure 9:
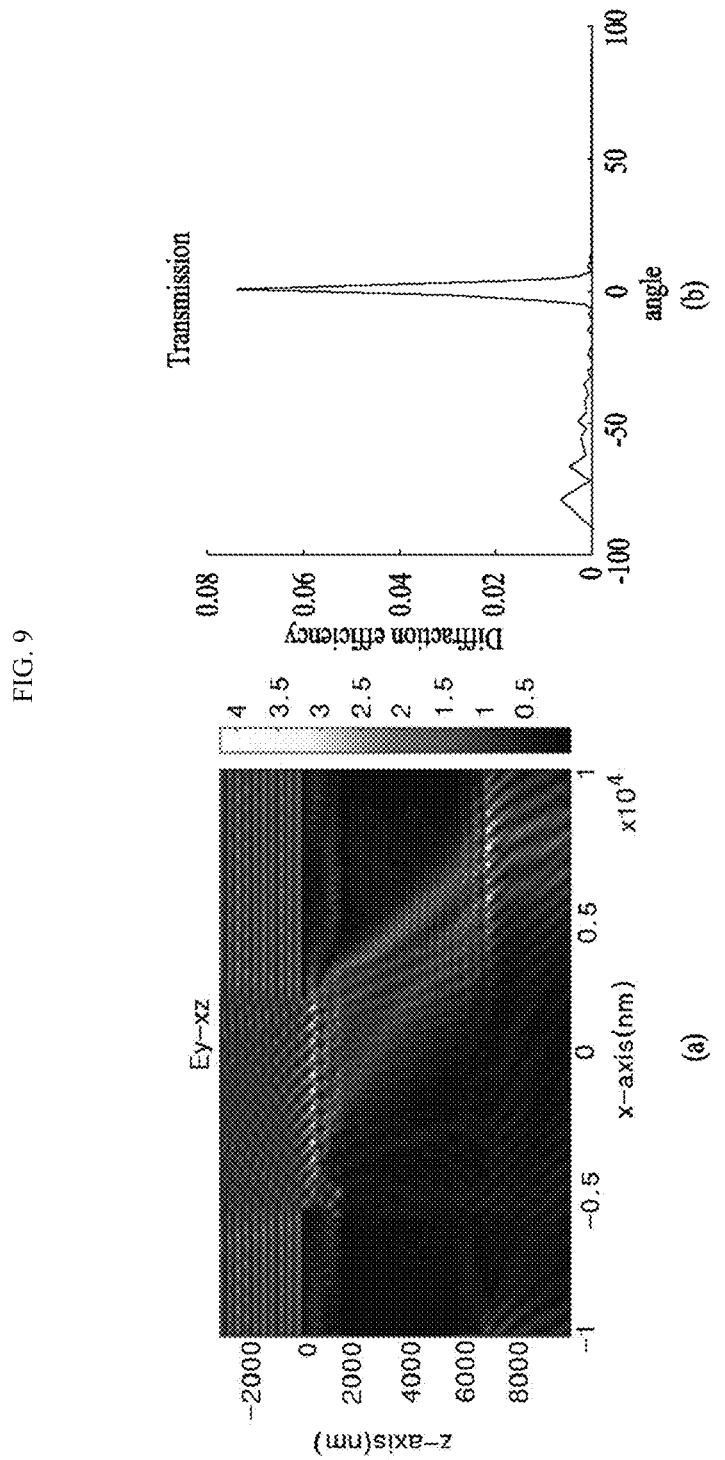
FIG. 9 is a diagram for describing characteristics of the waveguide device according to the third embodiment.

FIG. 8 is a diagram illustrating a waveguide device 800 (e.g., the waveguide device 100 in FIGS. 1 and 2) according to a third embodiment. FIG. 9 is a diagram for describing characteristics of the waveguide device 800 according to the third embodiment.

Referring to FIG. 8, the waveguide device 800 according to the third embodiment may include a waveguide 810 (e.g., the waveguide 110 in FIGS. 1 and 2) and a diffractive optical structure 820 (e.g., the diffractive optical structure 120 in FIGS. 1 and 2).

The waveguide 810 may guide light within the waveguide 810. The waveguide 810 may guide light generated by a light source S. The waveguide 810 may include a first face 811 (e.g., the first face 111 in FIGS. 1 and 2) and a second face 813 (e.g., the second face 113 in FIGS. 1 and 2). Furthermore, the first face 811 and the second face 813 may be isolated from each other by a thickness T of the waveguide 810. In this case, an axis X extending in a direction perpendicular to the first face 811 and the second face 813 may be defined.

The diffractive optical structure 820 may output at least some of the light guided in the waveguide 810. In this case, the diffractive optical structure 820 may be disposed on the first face 811 and second face 813 of the waveguide 810, and may totally reflect light to the inside of the waveguide 810. Furthermore, the diffractive optical structure 820 may output light to the outside of the waveguide 810 in accordance with a predetermined area of the waveguide 810. The diffractive optical structure 820 may include a first polarization structure 821 (e.g., the first polarization structure 121 in FIGS. 1 and 2) and a second polarization structure 823 (e.g., the second polarization structure 123 in FIGS. 1 and 2). The first polarization structure 821 and the second polarization structure 823 may be disposed on opposite sides thereof with the waveguide 810 interposed therebetween in the axis X.

The first polarization structure 821 may include a first polarizer 822 (e.g., the first polarizer 220 in FIG. 2) and an input grating 841 (e.g., the diffraction grating 240 in FIG. 2).

The first polarizer 822 may be disposed on the first face 811 of the waveguide 810. For example, the first polarizer 822 may include a WGP. The first polarizer 822 may transmit, to the outside of the waveguide 810, a first polarized light of light guided within the waveguide 810. Furthermore, the first polarizer 822 may reflect, to the inside of the waveguide 810, a second polarized light of the light guided within the waveguide 310. In this case, the first polarizer 822 may include at least one opening 832. A part of the waveguide 810 may be exposed through the opening 832.

The input grating 841 may be disposed in accordance with the opening 832 of the first polarizer 822. For example, the input grating 841 may be inserted into the opening 832. For another example, the input grating 841 may be disposed to overlap the opening 832 in the axis X. The input grating 841 may input light to the inside of the waveguide 810. To this end, the input grating 841 may diffract light received from a light source S. At this time, the input grating 841 may diffract the light received from the light source S in opposite to the opening 832 of the first polarizer 822.

The second polarization structure 823 may be divided into a first area 825 and a second area 827. The first area 825 and the second area 827 may be disposed on a plane parallel to the second face 813 in the axis X. The second polarization structure 823 may include a second polarizer 830 (e.g., the second polarizer 230 in FIG. 2) and an output grating 843 (e.g., the diffraction grating 240 in FIG. 2).

The second polarizer 830 may be disposed on the second face 813 of the waveguide 810. The second polarizer 830 may be disposed over the first area 825 and the second area 827. The second polarizer 830 may reflect, to the inside of the waveguide 810, the second polarized light of the light guided within the waveguide 810. At this time, the second polarizer 830 may transmit, to the outside of the waveguide 810, the first polarized light of the light guided within the waveguide 810. Furthermore, the second polarizer 830 may transmit, to the outside of the waveguide 810, at least some of the second polarized light of the light guided within the waveguide 810. For example, the second polarizer 830 may include a WGP. That is, the second polarizer 830 may reflect the second polarized light to the inside of the waveguide 810 in the first area 825, and may transmit at least some of the second polarized light in the second area 827. To this end, the second polarizer 830 may be formed in a first thickness in accordance with the first area 825, and may be formed in a second thickness in accordance with the second area 827. The second thickness may be smaller than the first thickness.

The output grating 843 may be disposed in the second area 827. The output grating 843 may be disposed to overlap the second polarizer 830 in the second area 827 in the axis X. In this case, the output grating 843 may be stacked on the second polarizer 830 in the second area 827. The output grating 843 may output, to the outside of the waveguide 810, at least some of the second polarized light of the light guided within the waveguide 810. To this end, the output grating 843 may diffract at least some of the second polarized light transmitted through the second polarizer 830 in the second area 827. In this case, the output grating 843 may output at least some of the second polarized light in a direction parallel to the direction of light inputted from the light source S to the input grating 841.

According to the third embodiment, the input grating 841 may input, to the waveguide 810, light received from the light source S. The input grating 841 may input, to the waveguide 810, the light received from the light source S through the opening 832 of the first polarizer 822. Accordingly, the waveguide 810 may guide the light received through the input grating 841 within the waveguide 810, as illustrated in FIG. 8. Accordingly, the light received through the input grating 841 may fully reach the output grating 843.

According to the results of measurement of an intensity distribution of light in the waveguide device 810, as illustrated in (a) of FIG. 9, light received through the input grating 841 may be outputted through the output grating 843.

For example, at a location where a value of an x axis is 0 and a value of a z axis is 0, the input grating 841 may input, to the waveguide 810, light received from the light source S in a direction parallel to the axis X. Furthermore, in an area corresponding to a value of a z axis having 0 to 8000 nm, light received from the light source S may be guided within the waveguide 810. Furthermore, the output grating 843 may output at least some of the light guided within the waveguide 810 in a direction parallel to the axis X in the second area 827. At this time, the light guided within the waveguide 810 may not be transmitted to the outside of the waveguide 810 in the first area 825. For example, as illustrated in (b) of FIG. 9, the amount of light transmitted to the outside of the waveguide 810 in the first area 825 may be insignificant. In this case, in (b) of FIG. 8, the x axis may indicate the direction of light, and the y axis may indicate transmissivity.

Figure 10B:
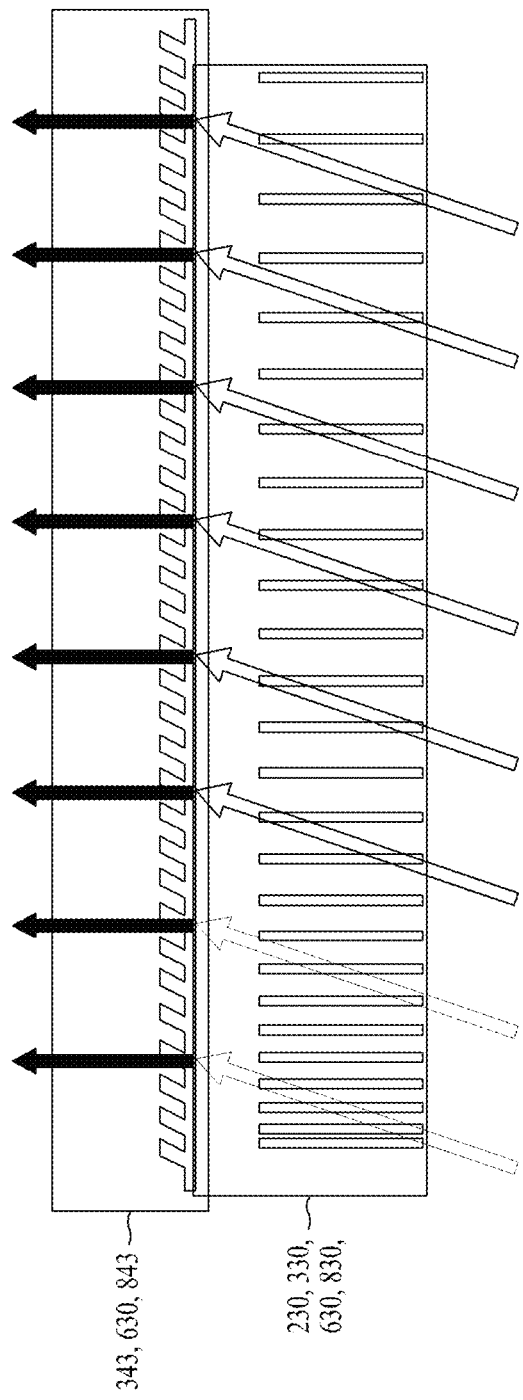
Figure 11:
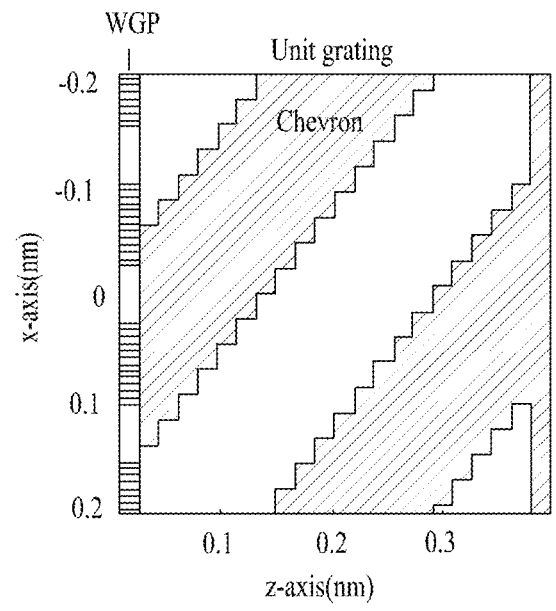
FIGS. 11, 12 and 13 are diagrams for describing a characteristic change attributable to a modification of the second polarizer in a waveguide device according to various embodiments.
Figure 11:
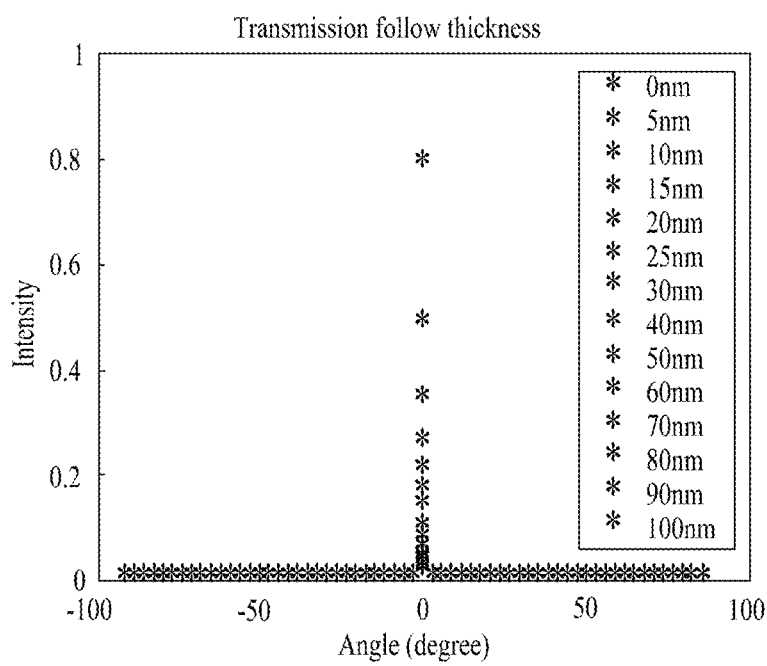
Figure 12:
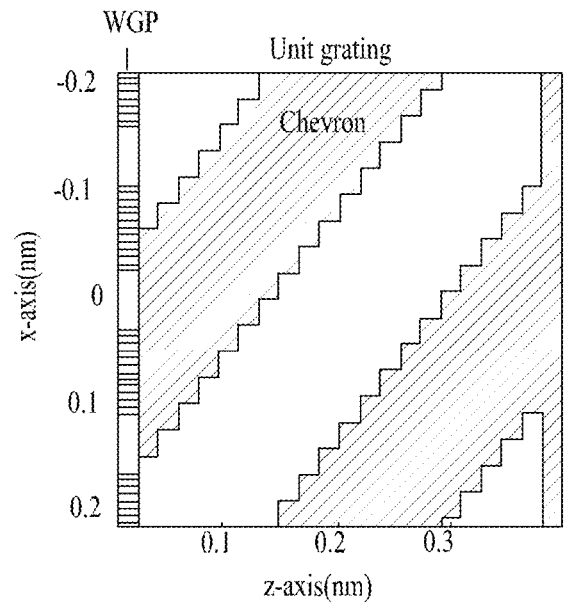
Figure 12:
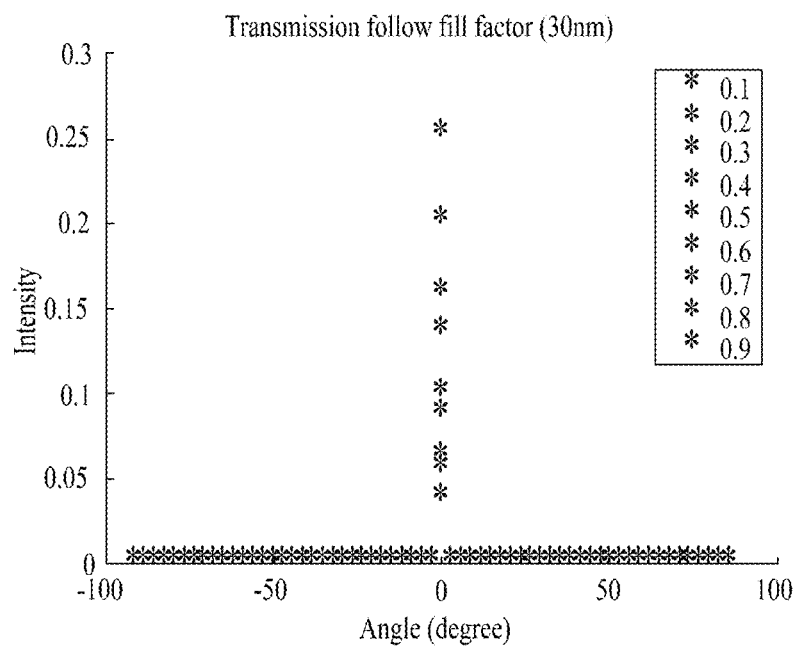
Figure 13:
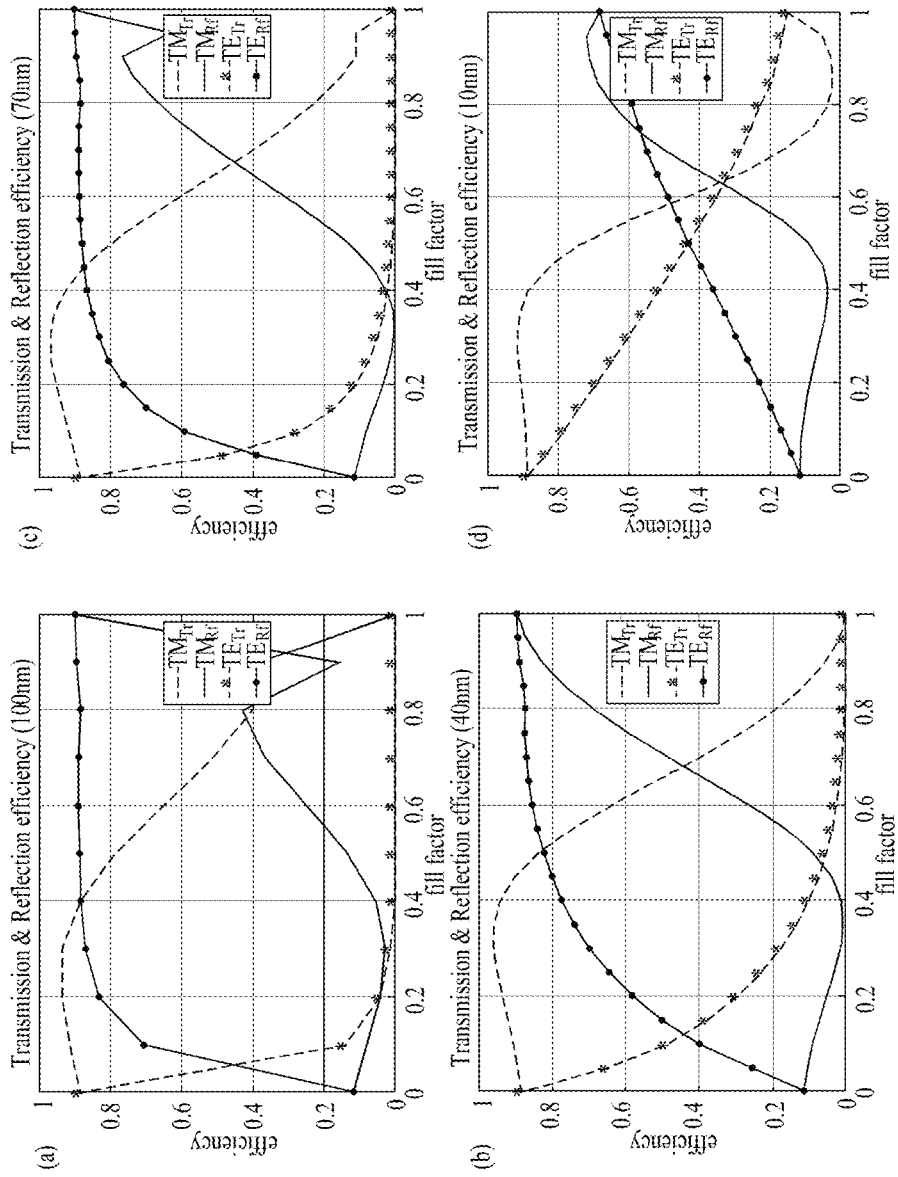

FIGS. 10A and 10B are diagrams illustrating modified examples of the second polarizer 230, 330, 630, 830 in the waveguide device 100, 300, 600, 800 according to various embodiments. FIGS. 11, 12 and 13 are diagrams for describing a characteristic change attributable to a modification of the second polarizer 230, 330, 630, 830 in the waveguide device 100, 300, 600, 800 according to various embodiments.

Referring to FIGS. 10*a* and 10*b*, the second polarizer 230, 330, 630, 830 of the waveguide device 100, 300, 600, 800 according to various embodiments may be nonuniformly formed in accordance with the output grating 343, 640, 843. Accordingly, the intensity of light outputted by the output grating 343, 640, 843 may be uniform.

For example, the thickness of the second polarizer 230, 330, 630, 830 may be nonuniform in accordance with the output grating 343, 640, 843, as illustrated in FIG. 10*a*. According to an embodiment, as a distance from the input grating 341, 841 is increased, the thickness of the second polarizer 330, 830 may be reduced. According to another embodiment, as a distance from the light source S disposed within the waveguide 610 is increased, the thickness of the second polarizer 630 may be reduced. If the second polarizer 230, 330, 630, 830 and the output grating 343, 640, 843 are disposed as a structure, such as that illustrated in (a) of FIG. 11, when an angle of the second polarizer 230, 330, 630, 830 and the output grating 343, 640, 843 is 0° as illustrated in (b) of FIG. 11, light may be outputted from the output grating 343, 640, 843. As illustrated in (b) of FIG. 11, as the thickness of the second polarizer 230, 330, 630, 830 is increased, transmissivity of the second polarizer 230, 330, 630, 830 may be decreased.

For another example, as illustrated in FIG. 10*b*, the fill factor of the second polarizer 230, 330, 630, 830 may be nonuniform in accordance with the output grating 343, 640, 843. According to an embodiment, as a distance from the input grating 341, 841 is increased, the fill factor of the second polarizer 330, 830 may be reduced. According to another embodiment, as a distance from the light source S disposed within the waveguide 610 is increased, the fill factor of the second polarizer 630 may be reduced. If the second polarizer 230, 330, 630, 830 and the output grating 343, 640, 843 are disposed as a structure, such as that (a) of FIG. 12, when an angle of the second polarizer 230, 330, 630, 830 and the output grating 343, 640, 843 is 0° as illustrated in (b) of FIG. 12, light may be outputted from the output grating 343, 640, 843. As illustrated in (b) of FIG. 12, when the thickness of the second polarizer 230, 330, 630, 830 is constant, transmissivity of the second polarizer 230, 330, 630, 830 may be decreased as the fill factor of the second polarizer 230, 330, 630, 830 is increased.

According to various embodiments, as illustrated in FIG. 13, as the thickness of the second polarizer 230, 330, 630, 830 is decreased, characteristics of the second polarizer 230, 330, 630, 830 may be weakened. That is, as the thickness of the second polarizer 230, 330, 630, 830 is decreased, reflectivity of the second polarized light may be decreased and transmissivity of the second polarized light may be increased in the second polarizer 230, 330, 630, 830. Likewise, although not illustrated, as the fill factor of the second polarizer 230, 330, 630, 830 is decreased, characteristics of the second polarizer 230, 330, 630, 830 may be weakened. That is, as the fill factor of the second polarizer 230, 330, 630, 830 is decreased, reflectivity of the second polarized light may be decreased and transmissivity of the second polarized light may be increased in the second polarizer 230, 330, 630, 830.

Figure 14:
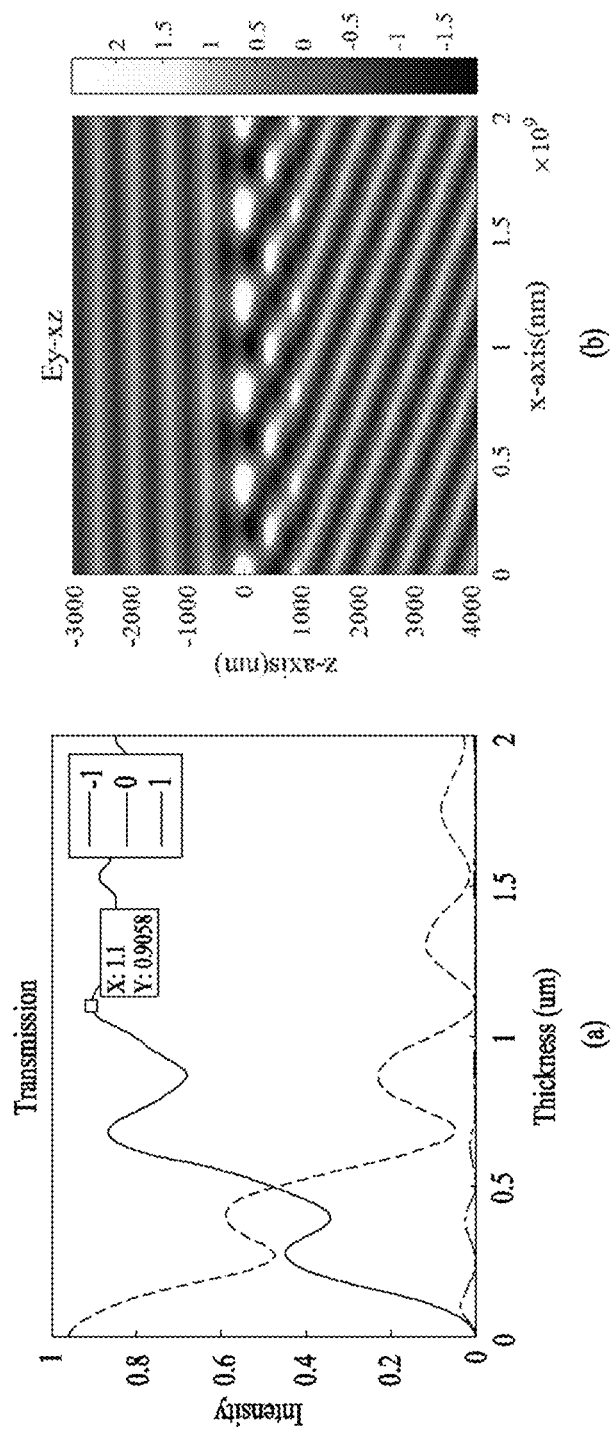
FIG. 14 is a diagram for describing characteristic of an input grating in a waveguide device according to various embodiments.

FIG. 14 is a diagram for describing characteristics of the input grating 341, 841 in the waveguide device 100, 300, 800 according to various embodiments.

Referring to FIG. 14, in the waveguide device 100, 300, 800 according to various embodiments, the input grating 341, 841 may have an optimized thickness. To this end, as illustrated in (a) of FIG. 14, a diffraction characteristic according to a thickness of the input grating 341, 841 may be measured. Accordingly, a thickness of the input grating 341, 841 corresponding to a peak level of a diffraction characteristic may be detected as approximately 1.1 um. Since the waveguide device 100, 300, 800 includes the input grating 341, 841 having an optimized thickness, a plane wave perpendicularly incident on the input grating 341, 841 may be bent 45° by the input grating 341, 841, as illustrated in (b) of FIG. 14.

Figure 15:
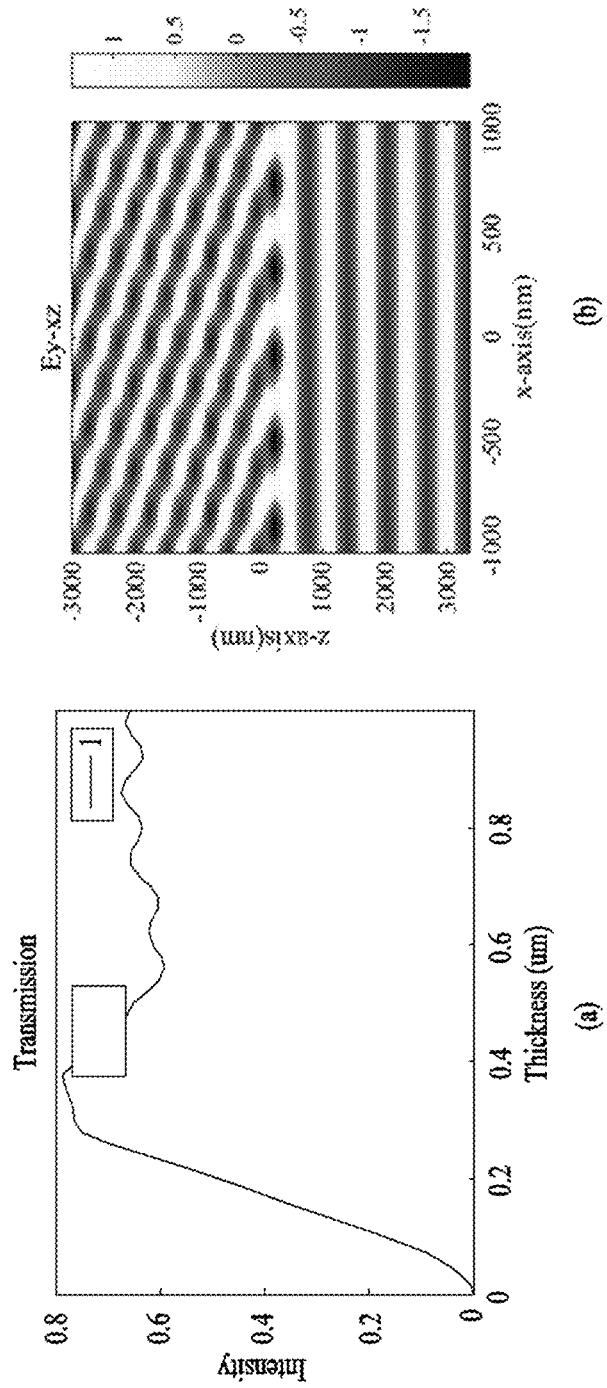
FIG. 15 is a diagram for describing characteristics of an output grating in a waveguide device according to various embodiments.

FIG. 15 is a diagram for describing characteristics of the output grating 343, 640, 843 in the waveguide device 100, 300, 600, 800 according to various embodiments.

Referring to FIG. 15, in the waveguide device 100, 300, 600, 800 according to various embodiments, the output grating 343, 640, 843 may have an optimized thickness. To this end, as illustrated in (a) of FIG. 15, a diffraction characteristic according to a thickness of the output grating 343, 640, 843 may be measured. Accordingly, a thickness of the output grating 343, 640, 843 corresponding to a peak level of a diffraction characteristic may be detected as approximately 0.36 um. Since the waveguide device 100, 300, 600, 800 includes the output grating 343, 640, 843 having an optimized thickness, a plane wave incident on the output grating 343, 640, 843 at 50° may be perpendicularly transmitted by the output grating 343, 640, 843 as illustrated in (b) of FIG. 15.

An AR display according to various embodiments may include the light source S configured to generate light related to an image and the waveguide device 100, 300, 600, 800 outputting at least some of the light.

According to various embodiments, the waveguide device 100, 300, 600, 800 may include the waveguide 110, 310, 610, 810 guiding light therein, and the diffractive optical structure 120, 320, 620, 820 disposed on the first face 111, 311, 611, 811 and second face 113, 313, 613, 813 of the waveguide 110, 310, 610, 810 and outputting at least some of light to the outside of the waveguide 110, 310, 610, 810.

According to various embodiments, the diffractive optical structure 120, 320, 620, 820 may include the first polarization structure 121, 321, 621, 821 disposed on the first face 111, 311, 611, 811 of the waveguide 110, 310, 610, 810, transmitting a first polarized light of light to the outside of the waveguide 110, 310, 610, 810, and reflecting a second polarized light of the light to the inside of the waveguide 110, 310, 610, 810, and the second polarization structure 123, 323, 623, 823 disposed on the second face 113, 313, 613, 813 of the waveguide 110, 310, 610, 810 and outputting at least some of the second polarized light to the outside of the waveguide 110, 310, 610, 810.

According to various embodiments, the second polarization structure 123, 323, 623, 823 may be divided into the first area 325, 625, 825 in which the second polarized light is reflected to the inside of the waveguide 110, 310, 610, 810 and the second area 327, 627, 827 in which at least some of the second polarized light is outputted to the outside of the waveguide 110, 310, 610, 810. The first area 325, 625, 825 and the second area 327, 627, 827 may be disposed on a plane parallel to the second face 113, 313, 613, 813.

According to various embodiments, the second polarization structure 123, 323, 623, 823 may include a polarizer disposed over the first area 325, 625, 825 and the second area 327, 627, 827, that is, the second polarizer 230, 330, 630, 830, and the output grating 343, 640, 843 disposed to overlap a polarizer, that is, the second polarizer 230, 330, 630, 830, in the second area 327, 627, 827 in an axis perpendicular to the second face 113, 313, 613, 813.

According to various embodiments, a polarizer, that is, the second polarizer 230, 330, 630, 830, may transmit some of the second polarized light in opposite to the output grating 343, 640, 843 in the second area 327, 627, 827.

According to various embodiments, a polarizer, that is, the second polarizer 230, 330, 630, 830, may be formed in a first thickness in accordance with the first area 325, 625, 825, and may be formed in a second thickness smaller than the first thickness in accordance with the second area 327, 627, 827.

According to an embodiment, the diffractive optical structure 320, 820 may further include the input grating 341, 841 inputting light to the inside of the waveguide 310, 810. At least any one of the first polarization structure 321, 821 or the second polarization structure 323, 823 may include the at least one opening 332, 832 in which the input grating 341, 841 is disposed and which transmits light to the inside of the waveguide 310, 810.

According to another embodiment, the light source S may generate light within the waveguide 610.

According to various embodiments, a field of view (FOV) of an AR display can be improved because the first polarization structure 121, 321, 621, 821 and the second polarization structure 123, 323, 623, 823 totally reflect light guided in the waveguide 110, 310, 610, 810. That is, since the first polarization structure 121, 321, 621, 821 and the second polarization structure 123, 323, 623, 823 totally reflect light guided in the waveguide, a loss attributable to the transmission of light guided in the waveguide 110, 310, 610, 810 can be blocked. Accordingly, the FOV of the AR display can be improved regardless of an incident angle of light inputted to the waveguide 110, 310, 610, 810. Furthermore, at least any one of a reduction in size or a reduction in weight of an AR display can be implemented by forming at least any one of the input grating 341, 841 or the output grating 343, 640, 843 as a chevron grating having an intensity adjustment characteristic of light.

Although various embodiments of this document have been described, this document may be modified in various ways without departing from the scope of various embodiments of this document. Accordingly, the scope of various embodiments of this document should not be limited to the aforementioned embodiments, but should be defined by not only the claims, but equivalents thereof.

What is claimed is:

1. A diffractive optical structure of an augmented reality display, comprising:
a first polarization structure disposed on a first face of a waveguide, transmitting a first polarized light of external light to an outside of the waveguide, and reflecting, to an inside of the waveguide, a second polarized light guided within the waveguide; and
a second polarization structure disposed on a second face of the waveguide and outputting at least some of the second polarized light to the outside of the waveguide.

2. The diffractive optical structure of claim 1, wherein:
the second polarization structure is divided into a first area in Which the second polarized light is reflected to the inside of the waveguide, and a second area in which at least some of the second polarized light is outputted to the outside of the waveguide, and
the first area and the second area are disposed on a plane; parallel to the second face.

3. The diffractive optical structure of claim 2, wherein the second polarization structure comprises:
a polarizer disposed over the first area and the second area; and
an output grating disposed to overlap the polarizer in the second area in an axis perpendicular to the second face.

4. The diffractive optical structure of claim 3, wherein the polarizer transmits some of the second polarized light in opposite to the output grating in the second area.

5. The diffractive optical structure of claim 3, wherein the polarizer is formed in a first thickness in accordance with the first area and is formed in a second thickness smaller than the first thickness in accordance with the second area.

6. The diffractive optical structure of claim 1, wherein a light source generates light within the waveguide.

7. The diffractive optical structure of claim 1, further comprising an input grating inputting light to the inside of the waveguide.

8. The diffractive optical structure of claim 7, wherein at least one of the first polarization structure or the second polarization structure comprises at least one opening in which the input grating is disposed and which transmits the light to the inside of the waveguide.

9. A waveguide device of an augmented reality display, comprising:
a waveguide guiding light therein;
a first polarization structure disposed on a first face of the waveguide and transmitting a first polarized light of external light to an outside of the waveguide and reflecting a second polarized light of the light to an inside of the waveguide; and
a second polarization structure disposed on a second face of the waveguide, transmitting the first polarized light of the external light to the outside of the waveguide, and outputting at least some of the second polarized light to the outside of the waveguide.

10. The waveguide device of claim 9, wherein:
the second polarization structure is divided into a first area in which the second polarized light is reflected to the inside of the waveguide; and a second area in which at least some of the second polarized light is outputted to the outside of the waveguide, and
the first area and the second area are disposed on a plane parallel to the second face.

11. The waveguide device of claim 10, wherein the second polarization structure comprises:
a polarizer disposed over the first area and the second area; and
an output grating disposed to overlap the polarizer in the second area in an axis perpendicular to the second face.

12. The waveguide device of claim 11, wherein the polarizer transmits at least some of the second polarized light in opposite to the output grating in the second area.

13. The waveguide device of claim 11, wherein the polarizer is formed in a first thickness in accordance with the first area and is formed in a second thickness smaller than the first thickness in accordance with the second area.

14. The waveguide device of claim 9, further comprising a light source generating light within the waveguide.

15. The waveguide device of claim 9, further comprising an input grating inputting light to the inside of the waveguide.

16. The waveguide device of claim 15, wherein at least one of the first polarization structure or the second polarization structure comprises at least one opening in which the input grating is disposed and which transmits the light to the inside of the waveguide.

17. An augmented reality display comprising:
a light source configured to generate light related to an image; and
a waveguide device outputting at least some of the light, wherein the waveguide device comprises:
a waveguide guiding the light therein;
a first polarization structure disposed on a first face of the waveguide, transmitting a first polarized light of the light to an outside of the waveguide, and reflecting a second polarized light of the light to an inside of the waveguide; and
a second polarization structure disposed on a second face of the waveguide and outputting at least some of the second polarized light to the outside of the waveguide.

18. The augmented reality display of claim 17, wherein:
the second polarization structure is divided into a first area in which the second polarized light is reflected to the inside of the waveguide; and a second area in which at least some of the second polarized light is outputted to the outside of the waveguide, and
the first area and the second area are disposed on a plane parallel to the second face.

19. The augmented reality display of claim 18, wherein the second polarization structure comprises:
a polarizer disposed over the first area and the second area; and
an output grating disposed to overlap the polarizer in the second area in an axis perpendicular to the second face.

20. The augmented reality display of claim 18, wherein:
the polarizer is formed in a first thickness in accordance with the first area and is formed in a second thickness smaller than the first thickness in accordance with the second area, and
some of the second polarized light is transmitted in opposite to an output grating in the second area.

* * * * *